United States Patent [19]

Ito et al.

[11] Patent Number: 5,334,920
[45] Date of Patent: Aug. 2, 1994

[54] RECORDING APPARATUS

[75] Inventors: Noriaki Ito, Yokohama; Shigeyasu Nagoshi, Kawasaki; Shigeru Yoshimura, Yokohama, all of Japan

[73] Assignee: Canon Kabushiki Kaisha, Tokyo, Japan

[21] Appl. No.: 712,048

[22] Filed: Jun. 7, 1991

[51] Int. Cl.⁵ .............................................. G05B 19/40
[52] U.S. Cl. ..................... 318/685; 318/696
[58] Field of Search ............................. 318/696, 685

[56] References Cited

U.S. PATENT DOCUMENTS

| | | | |
|---|---|---|---|
| 4,146,922 | 3/1979 | Brown et al. | 364/118 |
| 4,558,333 | 12/1985 | Sugitani et al. | |
| 4,698,566 | 10/1987 | Okamura | |
| 4,723,129 | 2/1988 | Endo et al. | |
| 4,740,796 | 4/1988 | Endo et al. | 364/1.1 |
| 4,928,050 | 5/1990 | Torisawa et al. | |
| 4,963,808 | 10/1990 | Torisawa et al. | |
| 5,029,264 | 7/1991 | Ito et al. | 318/685 |

FOREIGN PATENT DOCUMENTS

| | | |
|---|---|---|
| 0077444 | 4/1983 | European Pat. Off. |
| 0181742 | 5/1986 | European Pat. Off. |
| 2195956 | 4/1988 | United Kingdom |

OTHER PUBLICATIONS

Patent Abstracts of Japan, vol. 8, No. 80 (M289) (1517) Apr. 12, 1984–Abstract of Japanese Patent No. 58–224776.
IBM Technical Disclosure Bulletin, vol. 21, No. 3, Aug. 1978, "Automatic Gain Control for DC Servo System," Morgan, et al.

*Primary Examiner*—William M. Shoop, Jr.
*Assistant Examiner*—Karen Masih
*Attorney, Agent, or Firm*—Fitzpatrick, Cella, Harper & Scinto

[57] ABSTRACT

A recording apparatus which has reduced the speed variation and vibration of the motor uses a step motor as a driving source for a carrier for carrying a carriage mounted with a recorder or a recording medium. The apparatus includes a controller that, on accelerating the step motor, controls the step motor so that the step motor is driven with a shorter period than the mechanical time constant of the carrier when the rotary speed of the motor is less than a specified value, and so that the motor is driven with a longer period than the mechanical time constant when the rotary speed of the motor is more than the specified value.

7 Claims, 14 Drawing Sheets

SPEED / TIME

RECORDING APPARATUS

BACKGROUND OF THE INVENTION

1. Field of the Invention

This invention relates to a recording apparatus for using a stepping motor as a driving source for a carriage mounted with recording means or as a driving source for carrying a recording medium.

2. Related Background Art

In a conventional serial type printer, a hybrid type or PM type (permanent magnet type) stepping motor is used as a motor for driving a carriage to move a recording head mounted on a carriage during recording. In such a case, the carriage is secured on a carrying belt, and this belt is rotated by a pulley installed to the rotation shaft of the stepping motor. The carriage is so constructed as to scan in the recording direction for recording by the movement of the belt attendant upon the rotation of the motor.

Such a stepping motor is synchronized with an external pulse, and switches the exciting current to the motor exciting phase to drive it for rotation. If the exciting current is switched faster than a specified value, the rotation of the stepping motor rotor is slightly delayed, and an error step called "step-out" occurs. Such a step-out throws the movement of the recording head into disorder, causing position slippage or an image disturbance of the recorded image.

Especially when the carriage is accelerated, it should be noted that step-out tends to occur because the load due to inertia is great in addition to unstable rotation of the stepping motor.

A motor control device, which closed loop controls a conventional stepping motor to solve such a problem, has been disclosed by U.S. Pat. No. 4,963,808, and further such a stepping motor used for a printer was previously proposed by U.S. Pat. No. 4,928,050.

That is, in a recording apparatus for using a stepping motor as a driving source and moving a recording head to scan for recording, this proposal is a recording apparatus comprising detecting means for detecting the position of the angle of rotation of the stepping motor rotor, and control means for closed loop controlling of the drive of the stepping motor in accordance with a detection result of the detecting means.

It has been proposed to solve the problem by open loop controlling, and not by closed loop controlling the drive of the stepping motor in this way. However, the open loop control of the stepping motor has further had the following problems.

Since a stepping signal is applied to each exciting phase to rotate the rotor in the stepping motor, when the stepping motor is rotated at a low-speed, the rotation of the rotor generates vibration, causing noise. For example, FIG. 18A is a view showing the relationship between rotary speed and time when the stepping motor has been rotated with the speed curve taken in a straight line so that acceleration is constant. In this case, vibration occurs in the rotation of the stepping motor causing noise as shown by numeral 80 when the driving frequency is about 100 Hz, the resonance frequency of the stepping motor.

To prevent noise due to vibration during such an acceleration, it has also been considered to rapidly increase the rotation frequency of the stepping motor to a specified number of revolutions. However, when the stepping motor is rotated at a specified speed higher than the resonance frequency of the stepping motor from the beginning, step-out occurs, and therefore this cannot be used. Accordingly, a desired rotary speed should be reached by accelerating after starting the rotation at a sufficiently low speed at the beginning.

For this reason, the stepping motor is conventionally driven for rotation so that the speed variation from the start to a constant speed follows an exponential curve in order to rotate the stepping motor without causing both step-out and noise.

In the above conventional example, however, the stepping motor rotor rotates late for a driving pulse applied to the motor when the carriage is accelerated for driving as mentioned above. For this reason, during drive at a constant speed, in which the recording operation is started after acceleration, overspeed (overshoot) or speed variation, etc. occurs. This does not allow the carrying speed of the recording head to reach a specified constant speed even at a position where the recording operation is started, and the recording precision is lowered.

FIG. 18B is a view showing the speed variation of the carriage (recording head) when the stepping motor was driven for rotation in accordance with a conventional exponential curve, and numerals 81 and 82 show portions in which the overshoot and speed variation occur respectively.

If a speed variation occurs because of such an overshoot, etc., when vertical ruled lines, for example, are recorded over the entire recording area in both directions recording (recording is performed when the carriage moves forward and returns), the recording position of vertical ruled lines at both ends of the recording area slips by the motion of the recording head, and as a result, each of them may not be recorded as one line.

This is because, since the direction of recording is in both directions, when the carriage moves in the right direction, for example, a vertical ruled line at the right end is recorded after the speed of the recording head has become fully a constant speed, while a vertical ruled line at the left end is recorded immediately after it is accelerated. On the other hand, when the recording head moves in the left direction, a vertical ruled line at the left end is recorded at a constant speed, while a vertical ruled line at the right end is recorded immediately after acceleration.

To prevent such a chaotic recording operation the time from when the acceleration is over until the recording operation starts is made sufficiently long, so that the start of the recording operation occurs after these overshoots, etc. have ended. However, the recording time will be long because of an extra operation until a constant speed is reached since the acceleration is finished, and the width of the recording apparatus will be greater than necessary to secure such a distance.

SUMMARY OF THE INVENTION

It is an object of the present invention to correct the above defects by reducing the speed variation and vibration of a stepping motor for a recording apparatus.

It is another object of the present invention to shorten the rise time of the carriage to the target speed.

Other further objects of the present invention will be apparent from the following concrete embodiments.

DESCRIPTION OF THE PREFERRED EMBODIMENTS

An embodiment of the present invention will be described in detail referring to the attached drawings below.

Figure 1:
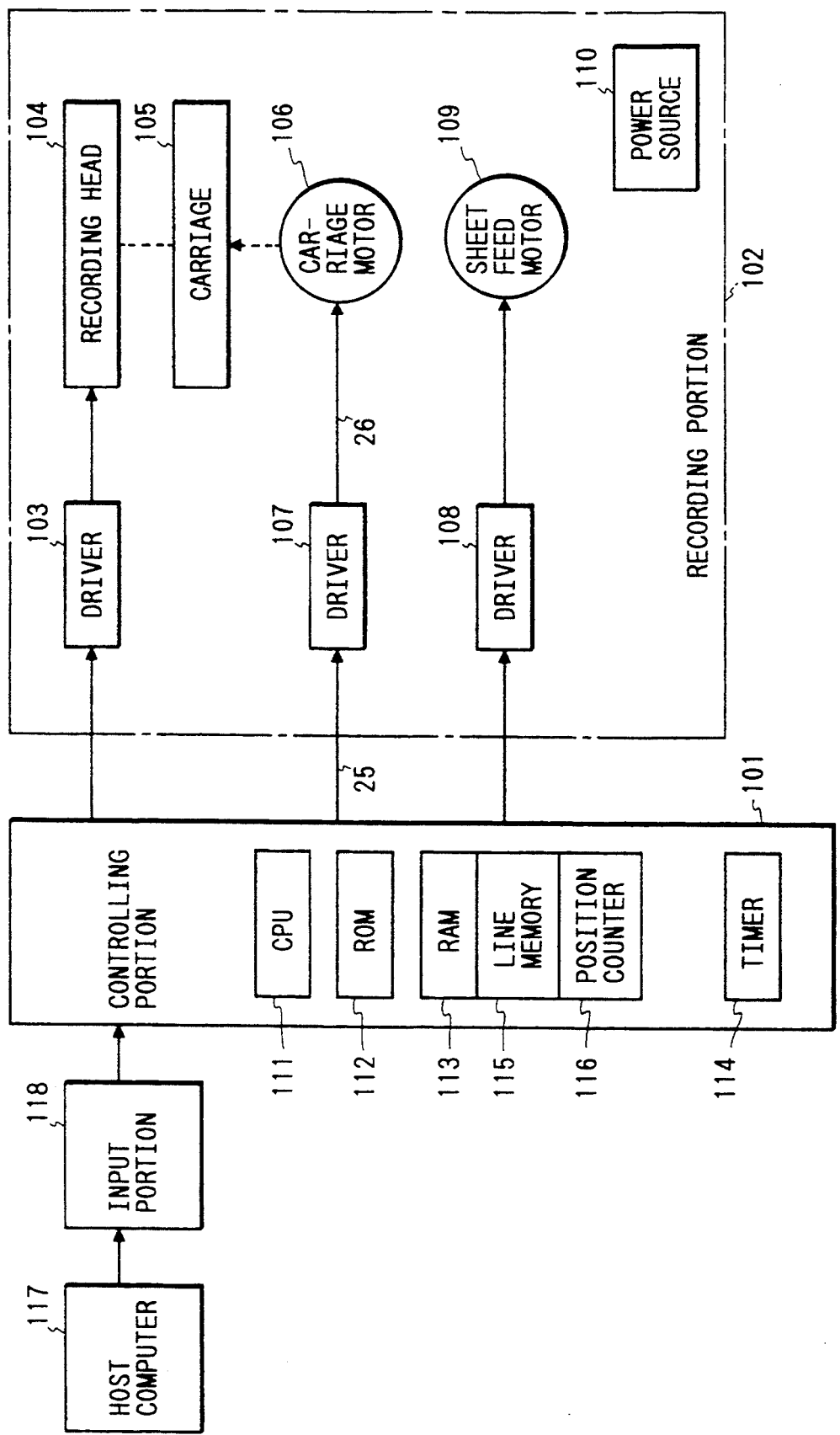
FIG. 1 is a block circuit diagram showing the outline configuration of a printer according to a first embodiment of the present invention.

FIG. 1 is a block diagram showing the outline configuration of an ink jet printer according to this embodiment.

In FIG. 1, a controlling portion 101 processes data received from a host computer 117, and also controls the entire printer. A recording portion 102 has a working portion of the printer. A host computer 117 transfers recording data and various recording control commands into the printer in this embodiment. An input portion 118 receives recording data from the host computer 117 and provides interface control.

For the configuration of the controlling portion 101, numeral 111 is a CPU such as a microcomputer, and executes various controls in accordance with a control program stored in a ROM 112. A RAM 113 is used as a work area for the CPU 111, and stores various data received from the host computer 117 and various data relating to the control of the CPU 111. This RAM 113 includes, for example, a line memory 115 for storing recording data for one line, a position counter 116 for storing the scanning position of the carriage, etc. Time data, etc. from the CPU 111 are input into a timer 114, and when a time corresponding to the time data is counted, the timer indicates a lapse of a specified time by causing an interrupt, etc., for example, to the CPU 111.

The configuration of a recording portion 104 will be described.

A recording head 104 for recording in the ink jet system is driven by a driver 103 in accordance with recording data from the controlling portion 101. A carriage 105 mounted with a recording head 104 is driven for carrying by a carriage motor 106. This carriage motor is a step motor in this embodiment, and is driven by a driver circuit 107. A pulse signal 25, which instructs a timing for switching the exciting phase of the carriage motor 106 from the controlling portion 101, is input into the driver circuit 107, which synchronizes with the timing of this pulse signal 25 for outputting a four-phase exciting signal 26.

Figure 4:
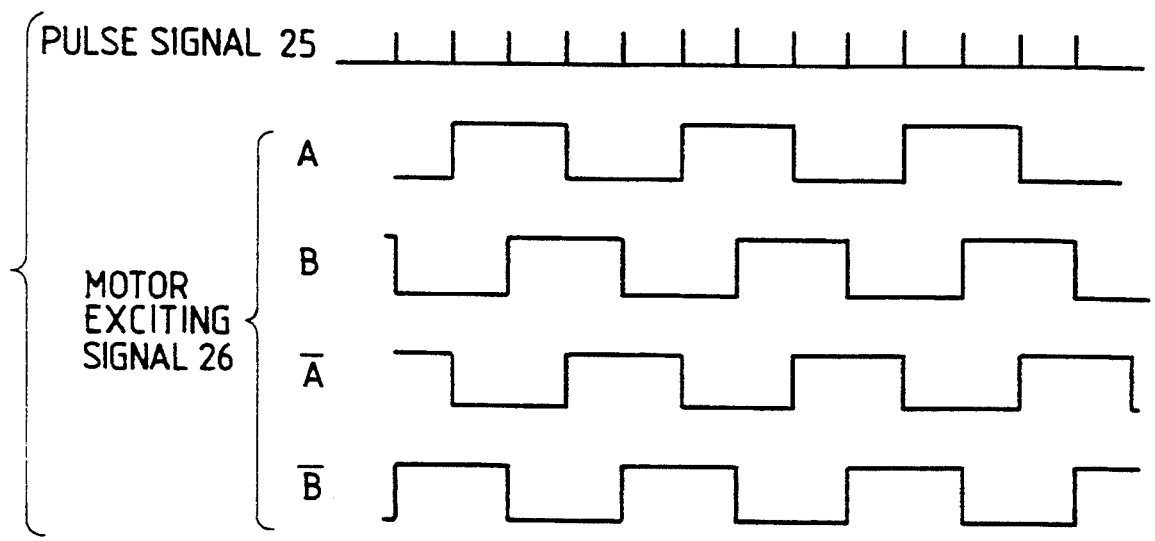
FIG. 4 is a view showing a driving signal of a carriage motor shown in FIG. 1.

FIG. 4 shows an example of this timing, and in FIG. 4, the carriage motor 106 is driven for rotation by two-phase excitation.

A sheet feed motor 109 consists of a stepping motor, for example, etc., and is driven for rotation by the driver circuit 108. A power source 110 supplies power to the entire apparatus.

Figure 2:
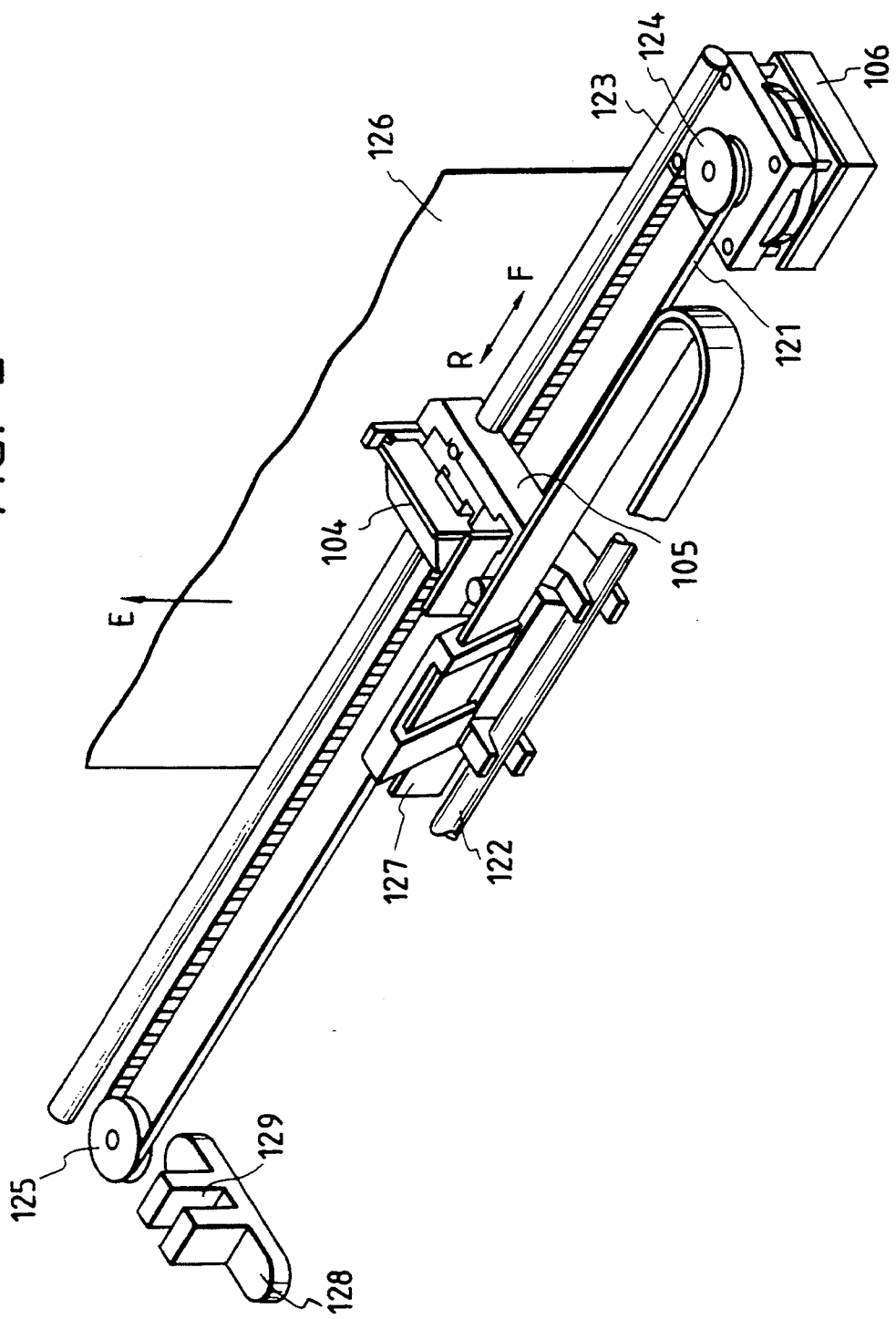
FIG. 2 is an appearance perspective view of the major part of a recording portion shown in FIG. 1.

FIG. 2 is a perspective view of the major part of a recording portion 102 shown in FIG. 1.

In FIG. 2, numeral 104 is an ink jet type recording head, for example, and a carriage 105 mounted with a recording head 104 reciprocates in the R and F directions is indicated by an R arrow and a F arrow along guide shafts 122 and 123. A timing belt 121 is connected to the carriage 105 at the both ends, and is stretched between pulleys 124 and 125. A carriage motor 106 drives the carriage 105 through the timing be lt 121 for carrying. A recording sheet 126 is held by a platen (not shown), etc. at a position opposite to the recording head 104, and recording is successively performed by scanning of the carriage 105.

The carriage 105 is provided with a masking shield 127. This masking shield 127 passes through a slit 129 in a photosensor 128 to cover the light, and it is thereby detected that the carriage 105 has arrived at the home position. This initializes a position counter 116 of the RAM 113 to "0". As the carriage moves in the F direction, that is, in the right direction from this initial position, its position is detected when the position counter 116 counts a pulse signal 25 for switching the excitation of a motor 106. At this time, recording is performed on a recording sheet 126 at the same time.

After the carriage 106 travels corresponding to recording for one line, a sheet feed motor 109 is driven for a specified amount of rotation to carry the recording sheet 126 only for one line in the direction of arrow E.

Figure 3A:
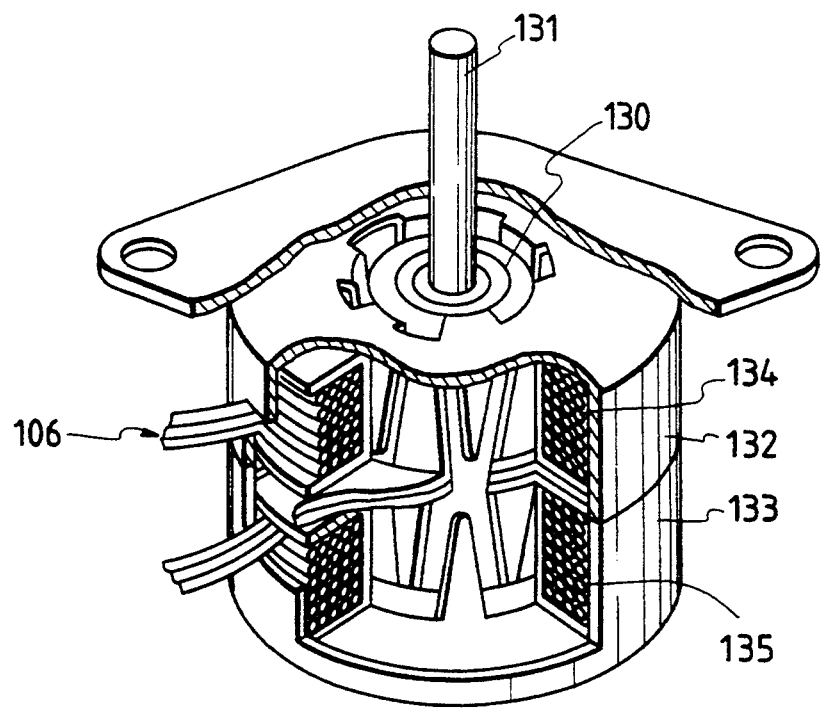
FIG. 3A is a partial cutaway perspective view of a carriage motor shown in FIG. 1.
Figure 3B:
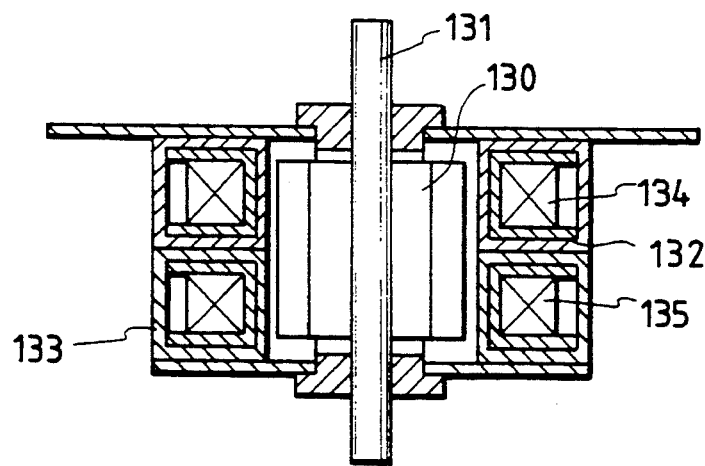
FIG. 3B is a sectional view of a motor shown in FIG. 3A.

FIGS. 3A and 3B are views showing an example of a configuration of the above-mentioned carriage motor 106. In FIGS. 3A and 3B, numeral 130 is a rotor of the carriage motor 106, numeral 131 is a rotor shaft, numerals 132 and 133 are a stator located around the rotor 130, and numerals 134 and 135 are coils.

The procedure of recording operation of the above-mentioned ink jet printer will be described referring to the flow charts in FIGS. 6A and 6B.

A control program corresponding to the procedure of this control operation is assumed to have been stored in the ROM 112.

This control processing is started when the start of recording processing for one line is ready after recording data at least for one page or one line has been transferred from the host computer 117.

First in step S1, it is determined from a signal from the photosensor 128 whether or not the carriage 105 is located at the home position at the left end in FIG. 2, and when not at the home position, the carriage motor 106 is driven in step S2 to move the carriage 105 to the home position. When the carriage 105 thus arrives at the home position, process proceeds to step S3 to initialize a position counter 116, etc.

Then the process proceeds to step S4, and the apparatus operates in the recording mode, etc. instructed by the host computer 117 to determine the speed and direction of rotation of the carriage motor 106. A driving pulse number of the carriage motor 106 to be required for recording for one line is determined from the amount of recording data to be recorded on one line. In step S5, a pulse signal 25 for instructing rotation of the motor is output to the driver circuit 107 for accelerating. This acceleration will be described in detail referring to the flow chart in FIG. 6B.

When the movement of the carriage 105 is thus started, the CPU 111 synchronizes with the pulse signal, counts up a position counter 116, and detects the position of the carriage 105 based on the discrete value. After acceleration is finished in step S6, it is determined whether or not the carriage 105 has arrived at the record-starting position, and if it has arrived, the process proceeds to step S7 to start the recording operation by driving the recording head 104. Recording is actually started when the carrying speed of the carriage 105 has become constant.

Then in step S8, it is determined from the discrete value, etc. of the position counter 116, whether or not the carriage 105 has arrived at a record-finishing position for one line, that is, recording for one line is finished. If recording for one line has not been finished, the process returns to step S9, and a pulse signal 25, output to drive the carriage motor 105 at a constant speed.

Although not specially mentioned in detail here, a time corresponding to exciting period of the motor 106 is set by the timer 114 for each time of excitation even while the carriage motor 106 is rotating at a constant speed, and the carriage motor 106 is driven for rotation at a constant speed whenever a timing signal (such as a time-out signal) from the timer 114 is input.

After recording for one line is finished in step S8, the method proceeds to step S10 to decelerate the carriage motor 106 by stopping the recording operation by the recording head 104. Then it is determined whether or not there is recording data for the next line. When there is no data for the next line but all recording processing is complete, the process proceeds to step S13, and the carriage motor 106 is driven to move the carriage 105 to the home position in order to complete the processing.

When all recording processing is not yet complete, the carriage 105 is moved to the record-starting position of the next line to record the recording data for the next line, and the process returns to step S4 again to execute the above processing.

In the case of reciprocating recording operation, the above-mentioned record-starting position of the next line is set to the right end of the recording width of the next line. When moving the carriage 105 in the opposite direction (R-direction in FIG. 2) by reversing the carriage motor 106, the position of the carriage 105 is, of course, detected by detecting a value of the position counter 116 by a pulse signal 25 for calculation.

The drive of the motor in the acceleration area will be described referring to the flow chart in FIG. 6B.

When instructed to accelerate, the process proceeds to step S21 to output a first pulse signal 25. This first pulse signal 25 generates an exciting magnetic field in the carriage motor 106 to hold the rotor 130 in a specified exciting position. This starts the rotation of the carriage motor 106 through a consecutive pulse signal row to be applied in step S22 and thereafter.

In step S22, start timing by the timer 114, and a pulse signal 25 is output in step S24 after a lapse of a specified time. Since then, the period of pulse signal 25 to be output in steps S24 to S27 is assumed to be a time $t_1$ which is timed by the timer 114.

This pulse interval $t_1$ is determined in the following way. That is, when the rotary speed of the carriage motor 106 is less than about half the rotary speed when recording is executed, the pulse interval will be less than a time interval (that is, a mechanical time constant of the carriage system) which the rotor 130 of the carriage motor 106 can follow up in step drive. Since this does not allow the rotor 130 of the carriage motor 106 to follow up a magnetic stability point which changes by switching the excitation, it rotates a little slower.

Figure 5:
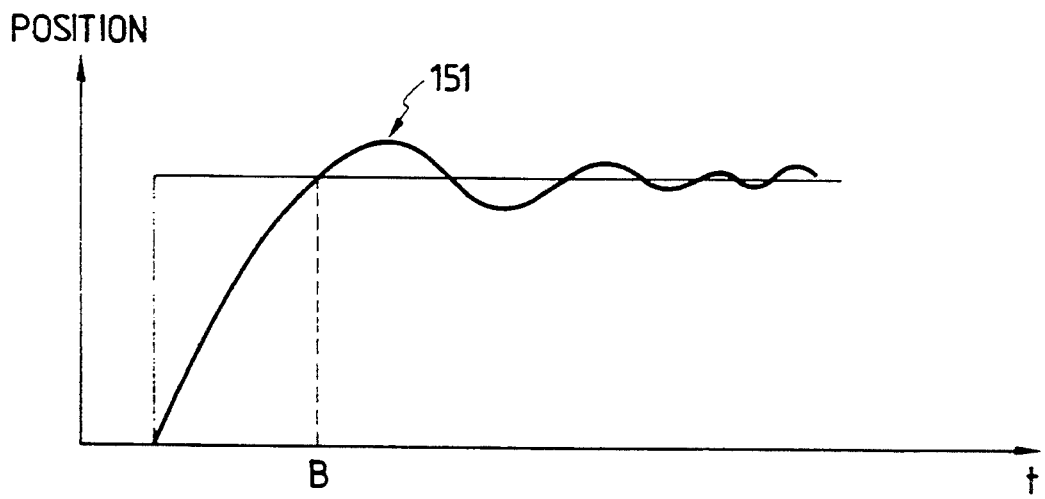
FIG. 5 is a view explaining the step-driven operation of a carriage motor shown in FIG. 1.

For example, FIG. 5 is a view explaining the rotary position to time when a step motor is step driven by one exciting signal.

A line shown by numeral 151 in FIG. 5 shows a profile of a step operation of the step motor. As can be seen from FIG. 5, when it is step driven, the step motor rotates more than a specified amount of rotation after a lapse of a longer time than time B, and starts vibration thereafter. On the other hand, the motor rotates smoothly until time B is reached. Accordingly, when the motor is driven for rotation with a period shorter than time B, the motor rotary speed rises continuously and smoothly, and such a phenomenon will not be seen that the rotor 130 vibrates near the magnetic stability point as seen when the step motor is driven at a constant speed and accelerates together with speed variation.

A carriage driving system shown in FIG. 2 consists of a carriage motor 106, pulleys 124 and 125, a timing belt 121, and a carriage 105 mounted with a recording head 104. Also a sliding shaft 122 is also related to the driving system through a frictional force. In this case, the mechanical time constant of the carriage system has a high value owing to the timing belt which is high in flexibility, and the value ranges from about hundred of scores to hundreds msec. Therefore, for the start of acceleration to a rotary speed of about a half of the final speed, the interval of switching the exciting phase of the carriage motor 106 may be shorter than this value.

Figure 6A:
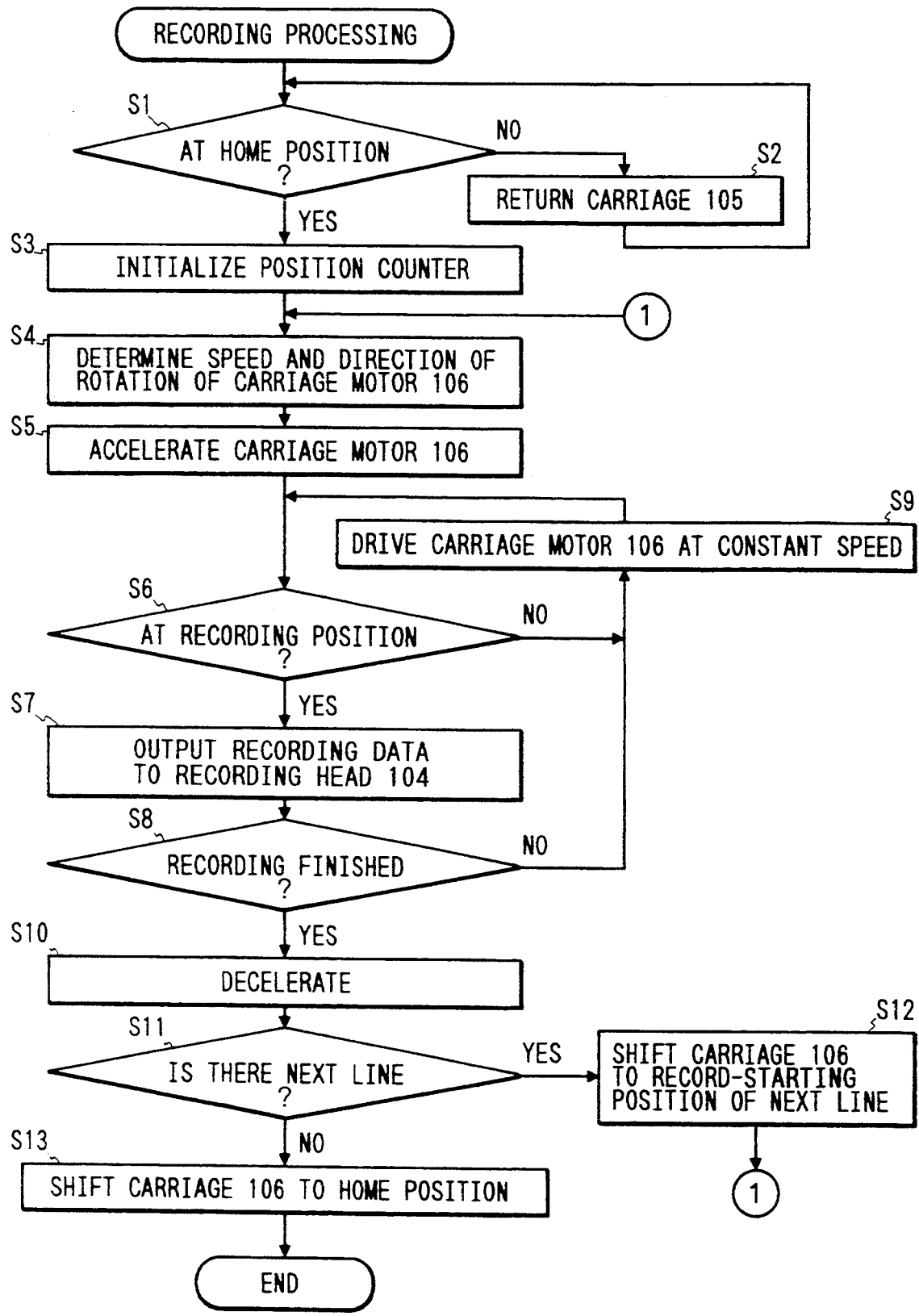
FIG. 6A is a flow chart of a circuit shown in FIG. 1.
Figure 6B:
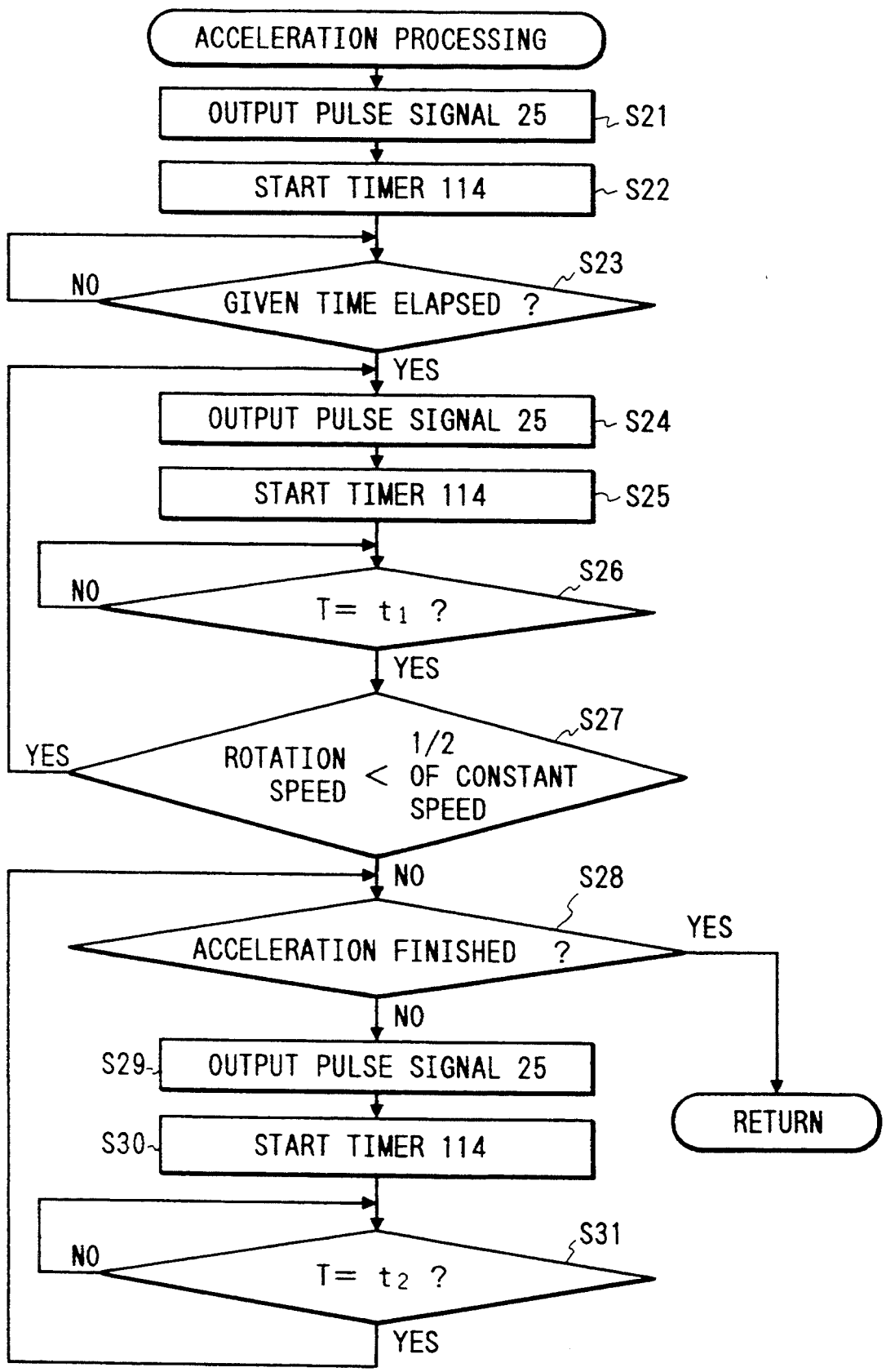
FIG. 6B is a flow chart of a circuit shown in FIG. 1 during acceleration processing.

This is shown in step S27 in FIG. 6B. When the rotary speed of the carriage motor 106 is less than about a half of the constant rotary speed, the process returns to step S24 to drive with a period of the above-mentioned time $t_1$.

When the rotary speed increases and exceeds a half of the final speed, the process proceeds from step S27 to step S28, and the interval of pulse signal 25 is longer ($T = t_2 > t_1$) than the above-mentioned time constant of the driving system. This is performed in steps S29 to S31. This enables the movement of the rotor 130 of the carriage motor 106 to follow up the speed of switching the excitation. Since, however, the vibration of the rotor 130 is suppressed by the inertia force of the rotor 130 attendant upon the rotation at this point, any speed variation such as vibration can be suppressed to a small value.

Also at this point, the carriage motor 106 synchronizes with the pulse signal 25 for rotation, and therefore the rotor 130 rotates without speed variation even if the acceleration is finished and the carriage shifts to drive at a constant speed for recording operation in step S6 in FIG. 6A. That is, an overshoot due to reaction of the rotor 130, which occurs when the rotation of the rotor 130 is late for the pulse signal 25, will not occur.

In FIG. 6B, when the rotary speed of the carriage motor 106 is less than a half of that during rotation at a constant speed (steps S24 to S26) and is more than a half of that during rotation at a constant speed (steps S29 to S31), it is shown that the pulse signal is output at regular intervals ($t_1$, $t_2$) respectively. However, it goes without saying that the period of the pulse signal 25 may be gradually shortened in steps S24 to S26 and steps S29 to S31.

Figure 7:
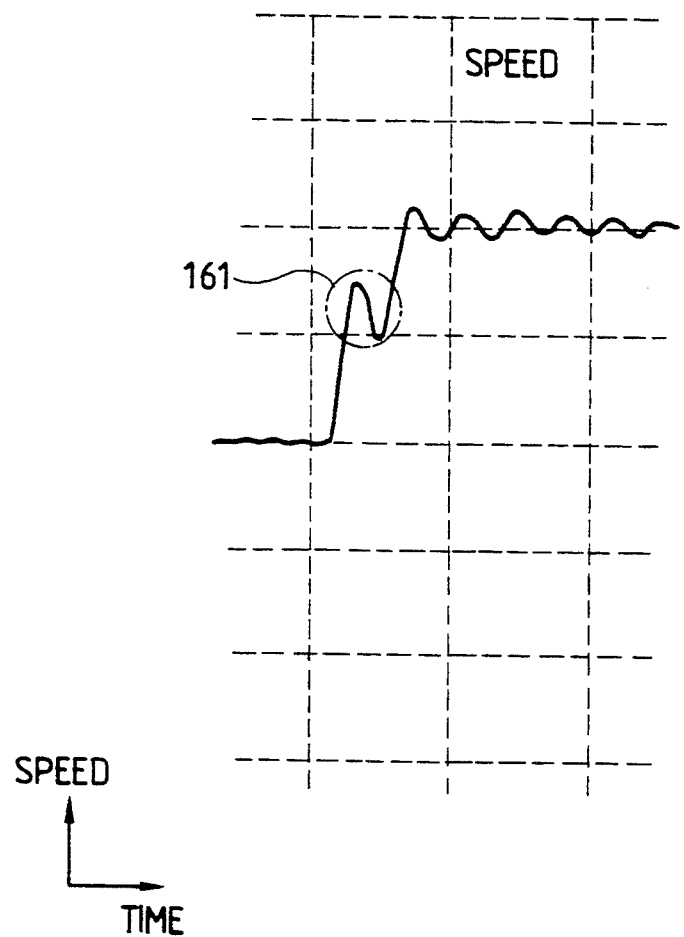
FIG. 7 is a view showing a variation of rotary speed of a carriage motor shown in FIG. 1.

FIG. 7 is a view of assistance in explaining the speed variation in the acceleration area of the carriage 105.

Figure 18A:
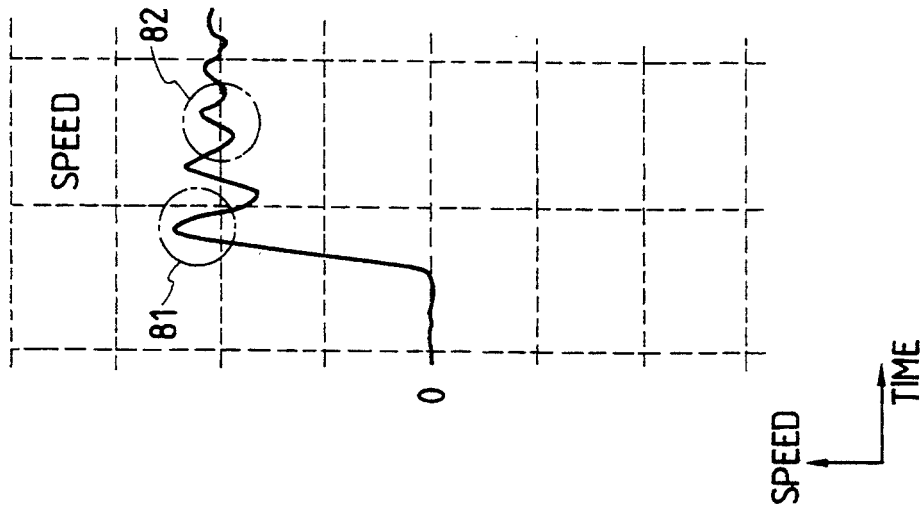
FIG. 18A is a view showing a variation in driving speed of a conventional carriage motor during acceleration.
Figure 18B:
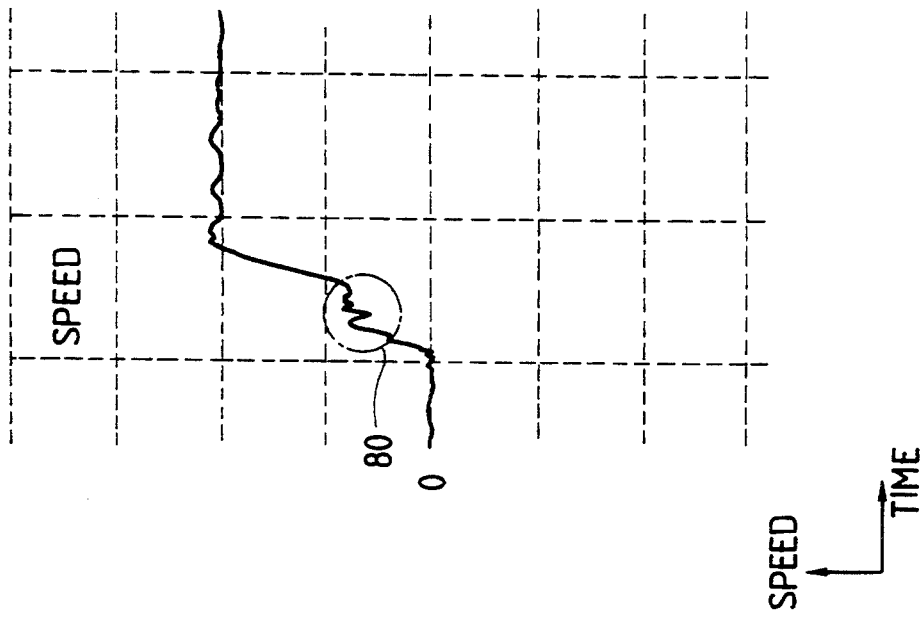
FIG. 18B is a view showing a variation in driving speed of a conventional carriage motor in an overshot state.

It can be seen that, although a speed variation is seen at a speed about a half of the final speed as shown by numeral 161 in FIG. 7, such an overshoot that occurs when the final speed is reached as shown in conventional FIG. 18B, will disappear, and yet the speed variation converges within a short time. Near the speed variation in the intermediate speed area in FIG. 7, the rotary speed of the carriage motor 106 is comparatively high, and therefore such noise as occurred with conventional motor drive does not occur, but quiet drive is possible.

Accordingly, even if the carriage is driven at a constant speed for recording, the speed stability is improved, and no uneven recording occurs.

A time table, which determines the output timing for the pulse signal 25 to drive the above-mentioned carriage motor 106, has been stored in the above-mentioned ROM 112, and is successively read out from the ROM 112 and set into the timer 114 from the CPU 111 when driving the carriage motor 106 for rotation. The exciting period for the carriage motor 106 is thus determined.

For a configuration for the carriage 105 and the carriage motor 106, the timing belt 121 is not directly rotated around the pulley 124 of the carriage motor 106 as shown in FIG. 2, but may be combined through one stage or several stages of timing gears.

Figure 8:
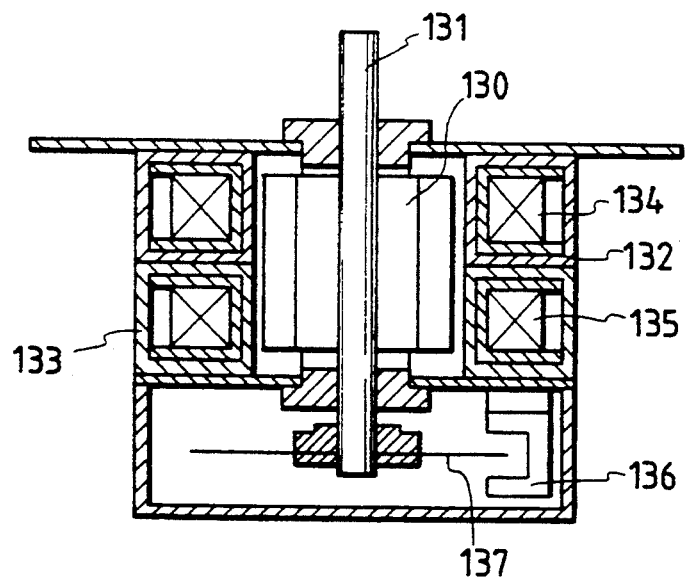
FIG. 8 is a section view when an encoder is added to a motor shown in FIG. 1.

In the above first embodiment, the position counter 116 counts the pulse single 25. In place of this, however, the following may, of course, be adopted: a detecting disk 137, which rotates together with rotation of a rotor shaft 131, is provided as shown in FIG. 8, the rotation of this detecting disk is detected by a photointerrupter 136, and a signal from this photointerrupter is counted by the position counter 116.

According to the first embodiment of the present invention as mentioned above, the carriage motor 106 has no vibration in the acceleration operation, but yet quiet and quick acceleration operation can be performed, enabling carrying the carriage with good precision.

Therefore, the carriage can be carried without vibration and uneven speed.

The second embodiment according to the present invention will be described referring to FIG. 9.

Figure 9:
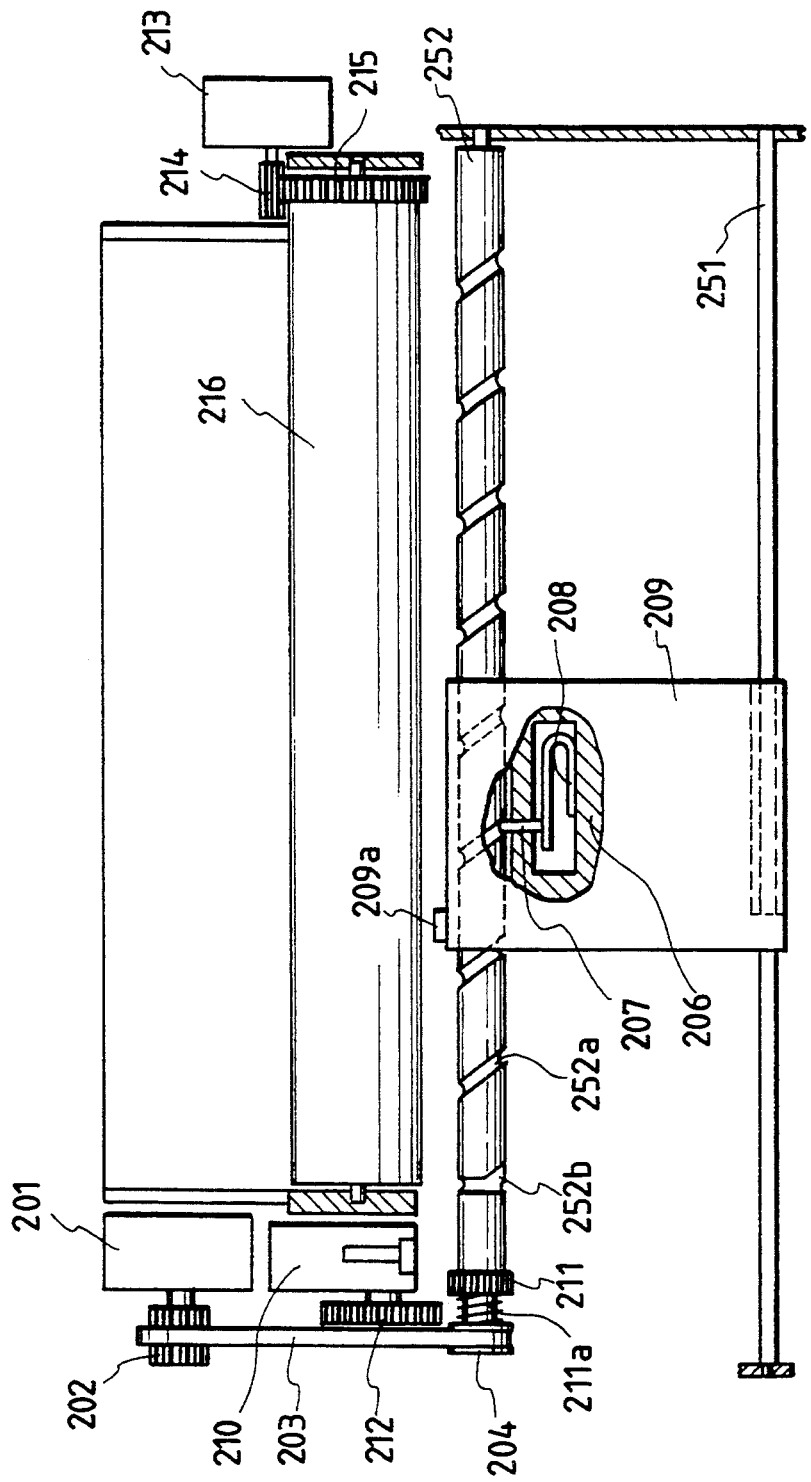
FIG. 9 is a configuration view showing the major part of the recording portion of a printer according to a second embodiment of the present invention.

FIG. 9 is a schematic outside view showing the major part of the recording portion of a printer.

In FIG. 9, a pulley 202 is coaxially installed to a carriage motor 201, and this pulley 202 is connected with a carriage shaft pulley 204 through a timing belt 203. This timing belt 203 is given a tension by a spring (not shown).

A recording head 209 is mounted on a carriage 206. This recording head 209 has an ink tank within, it whereby recording can be performed without receiving ink from others. This carriage 206 is supported by a lead screw 252 and a sliding shaft 251, which are guide members, and records on a recording medium (recording sheet) by shifting on the above-mentioned two shafts.

A recovery device 210 for the recording head is disposed at the home position (on the left side in FIG. 9) of this printer, and when the carriage 206 shifts and the recording head 209 comes at the home position, recovery for the recording head 209 is provided.

That is, when the carriage 206 comes to the home position, a pressure contact spring 211a allows a gear 211, which has been pressed in the right direction in FIG. 9, to engage a recovery system gear 212 by pressing the gear 211 in the left direction in FIG. 9. Since a lead pin as mentioned later is in a groove 252b at this time, the carriage 206 does not shift right-to-left by the rotation of the lead screw 252.

This engagement between the gear 211 and the recovery system gear 212 transmits the driving force of the carriage motor 201 to the recording head recovery device 210 to perform various operations such as cleaning the discharge surface of the recording head 209, and correcting clogging due to suction of ink.

A sheet feed motor 213 drives a sheet feed roller 216 through a motor gear 214 and a roller gear 215 to carry a recording medium. Recording is performed on the above-mentioned recording medium by means of carrying of this recording medium, scanning of the carriage 206, and the recording head 209. In this example, single reduction is used for reduction of the sheet feed motor 213. However, the reduction is not limited to single reduction, but direct drive, in which the sheet feed motor 213 is direct-coupled with the sheet feed roller 214, or multiple reductions such as dual reduction may be used.

The carriage 206 is driven for carrying by transmitting the driving force of the above-mentioned carriage motor 201 to the lead screw 252. As shown in FIG. 9, a spiral groove 252a is provided on the lead screw 252, and a lead pin 207 engages this groove 252a.

This lead pin 207 is guided in the axial direction by a bearing portion provided in the carriage 206. A lead pin spring 208 is pressed against an end (on the other side of the lead screw 252) of the lead pin 207, and the lead pin 207 is pressed against a groove 252a in the lead screw 252.

The other end of the lead pin spring 208 is installed on the carriage 206. In the rear portion (a print head discharge portion 209a side is regarded as the front portion) of the carriage 206, the sliding portion 251 is disposed, and is supported by a pin 206b of the carriage 206 and the carriage 206.

When the lead screw 252 is driven for rotation by the carriage driving motor 201, the lead pin 207 installed to the carriage 206 is guided by the groove 252a, whereby the carriage 206 and the recording head 209 record while reciprocating in the axial direction of the lead screw 252.

In this embodiment, the carriage system consists of a carriage driving motor 201, a pulley 202, a timing belt 203, a carriage shaft pulley 204, a lead screw 252, a carriage 206, and a recording head 209. In this case, since the inertia of the lead screw 252 is great, the resistance during acceleration is great. Accordingly, the mechanical time constant of the carriage system is also high, being nearly hundreds of msec.

Also in this second embodiment, it is possible to carry without causing vibration and overshoot to the recording head 209 by giving such a driving pulse timing as mentioned above in accordance with the speed when accelerating the carriage motor 201 in the same manner as in the above-mentioned first embodiment.

In FIG. 9 for the second embodiment, it goes without saying that the carriage motor 201 may be connected with the lead screw 252 through a gear instead of the timing belt 203.

A modified example of the above-mentioned second embodiment will be described referring to FIGS. 10 to 13. The same portions as in FIG. 9 are affixed with the same numerals, and their concrete description will be omitted.

Figure 10:
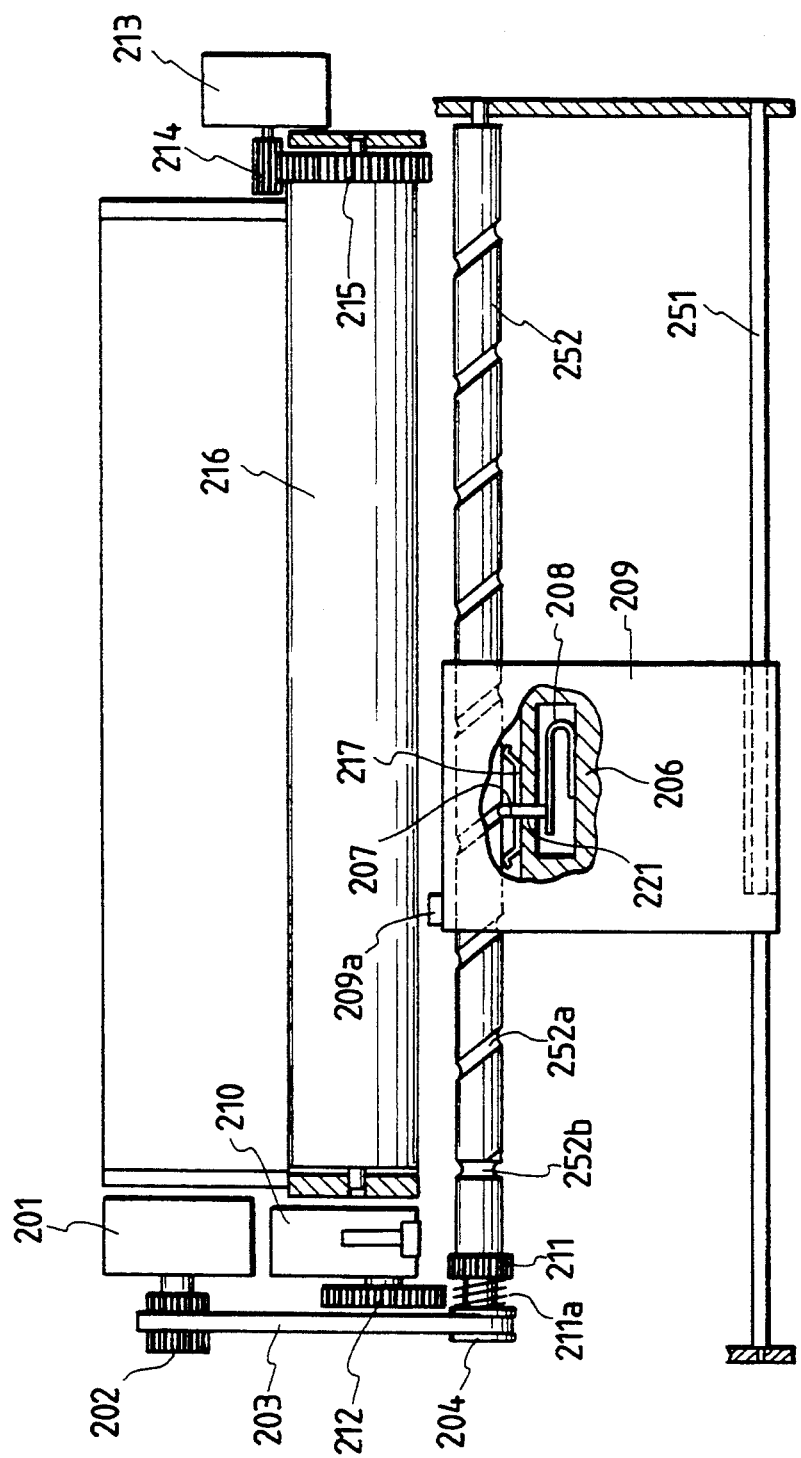
FIG. 10 is a configuration view showing a first modified example in FIG. 9.
Figure 11:
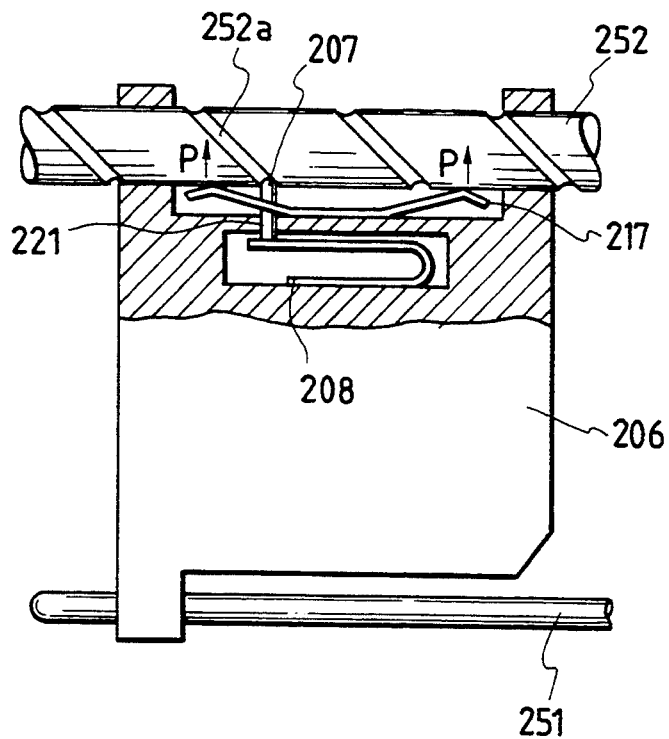
FIG. 11 is a plan view of a carriage guide mechanism shown in FIG. 10, partially broken away.
Figure 12:
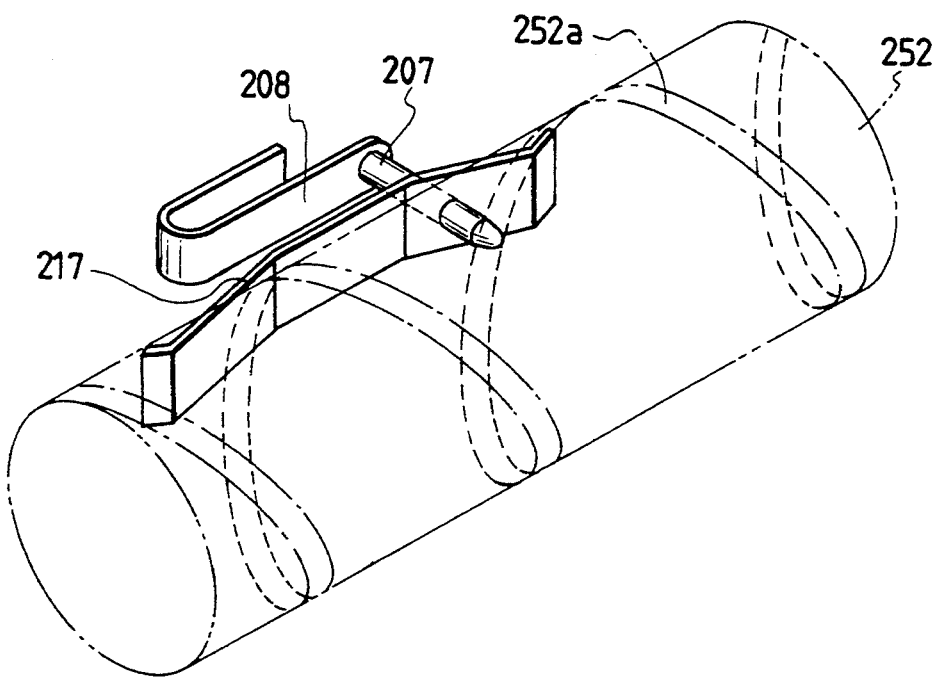
FIG. 12 is a perspective view showing the principal portion of FIG. 11.

In FIGS. 10 to 12, a carriage push spring 217 is disposed between a lead screw 252 and the carriage 206 to energize the carriage in a direction which keeps the carriage away from the lead screw 252.

This carriage push spring 217 is obtained by forming a long and narrow leaf spring into a specified shape, and is disposed along the lead screw 252. It is installed on the carriage at the center, and is pressed against the lead screw 252 at the both ends.

According to such a carriage guide mechanism, since the carriage push spring 217 presses the lead screw 252 in the direction in of arrow P FIG. 11, the movement of the carriage 206 in the guide direction. (axial direction of the lead screw 252) is controlled.

This enables smooth shifting of the carriage 206 at the rise time (lamp up from stop to target speed A) and at the fall time (lamp down from target speed A to stop) upon driving the carriage 206.

That is, smooth carriage driving can be performed by eliminating an unstable portion of the carriage moving speed brought about by inertia of the carriage and eliminating the occurrence of the vibration noise when accelerating and decelerating.

Figure 13:
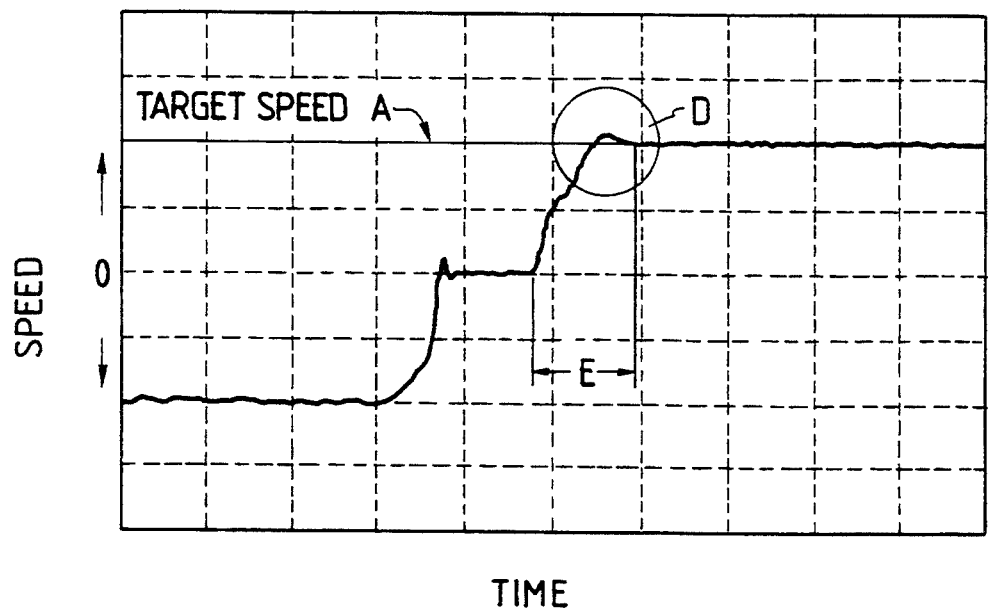
FIG. 13 is a speed characteristic diagram during the rise of a carriage shown in FIG. 10.

FIG. 13 is a speed diagram showing the fluctuation in the travel speed at the rise time of the carriage 20 6 shown in FIG. 10.

When accelerating the carriage 206 to the target speed A in FIG. 13, the carriage 206 could stabilized at the target speed A immediately, except for one overshoot as shown in D portion in FIG. 13.

The time E from zero speed to the target speed A can be considerably reduced as compared with the conventional amount of time.

From the foregoing, it is possible not only to reduce vibration noise at the rise and fall time of the carriage 206, but also to accelerate stabilization (stabilization to target speed) of the travel speed and to shorten the travel distance of the carriage 206 at the lamp up and down time. Therefore, it has become possible to miniaturize and reduce the weight of the recording apparatus.

Although the lead screw 252 was used as a guide member for the carriage 206 in the above examples, the present invention can be likewise used in a recording apparatus of a system, which uses a round shaft with a circular cross section and drives the carriage through a timing belt, etc., to have the same effect.

Also although the lead screw 252 was pressed at two places of the carriage push spring 217 in the above example, this pressing point may be changed to one place or more than two places.

The above-mentioned carriage push spring 217 is generally made of metallic material, and in the case of metallic material, metal rubs against metal to possibly cause unusual noise when the carriage 206 moves.

When such an unusual noise is likely to occur, it is desirable to coat solid lubricant on the surface (at least an area in contact with the lead screw 252) of the carriage push spring 217 to prevent direct contact between metals.

For the solid lubricant, lubricating material such as molybdenum system of fluoroplastic system can be used.

By thus coating solid lubricant on the carriage push spring 217, we could deaden the frictional sound between metals when the carriage moves, and deaden or reduce vibrational noise due to unstable speed during the lamp up and down.

Figure 14:
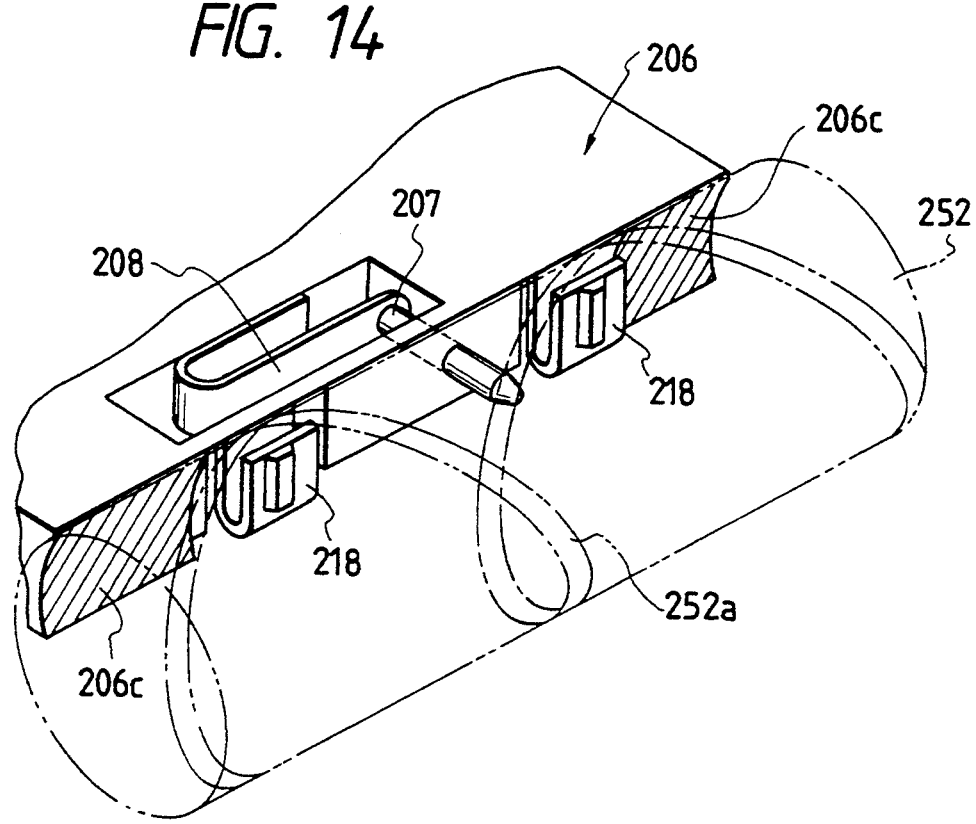
FIG. 14 is a fragmentary perspective view of a carriage guide mechanism showing a second modified example in FIG. 9.
Figure 15:
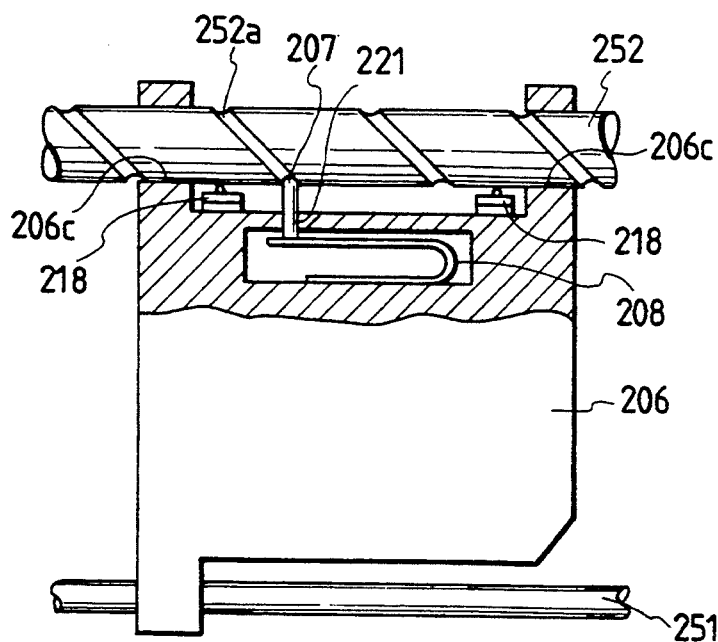
FIG. 15 is a plan view of a carriage guide mechanism shown in FIG. 14, partially broken away.

FIG. 14 is a partial perspective view of a carriage guide mechanism according to a modified example of the second embodiment in FIG. 9, and FIG. 15 is a partial cutaway plan view of a carriage guide mechanism in FIG. 14.

In FIGS. 14 and 15, in place of the carriage push spring 217 in FIG. 11, a carriage push portion (spring portion) 218 corresponding thereto is formed as a portion of the carriage 206.

A hatched portion 206c in FIG. 14 is a bearing portion formed in the carriage 206, that is, a fitted portion into the lead screw 252.

The carriage 206 is made of synthetic resin material, and therefore the carriage push portion 218 incorporated with the carriage is also made of the same resin material.

The carriage push portion 218 has a U-shaped cross section as shown in FIG. 14, and is pressed against the lead screw 252 by the elastic force (spring force) of the U-shaped portion. The elastic force controls the movement of the carriage 206 in the lead screw 252 axial direction.

In this example, the elastic member (carriage push portion as a spring) 218, which is disposed between the carriage 206 and the guide member (lead screw) 252, is made of resin material, and therefore no frictional sound between the lead screw 252 and the elastic member occurs even if it is used as it is without performing noise generation preventive treatment such as the above-mentioned coating of solid lubricant.

Also since the carriage push portion 218 as an elastic member is incorporated with the carriage 206, the cost can be reduced owing to less number of components and less assembly man-hours than the above-mentioned modified example of the first embodiment.

Although the lead screw 252 was used as a guide member for the carriage 206 in the above examples, the present invention can be likewise used in a recording apparatus, which uses a straight guide shaft, etc. without any helical channel 252a, etc., to have the same effect.

In a recording apparatus for recording by allowing a carriage mounted with a recording head to travel along a guide member in these examples, since it has been constructed so that an elastic member is provided between the carriage and the guide member, it is possible to reduce vibrational noise due to unstable speed at the lamp up and down time of the carriage, and to further shorten the static stabilization time to the target speed at the rise time, and the recording apparatus can be miniaturized and its weight can be reduced.

In the present invention, the serial type bubble jet recording system, one of the above-mentioned ink jet recording systems, is used as recording means, and this system will be described below.

Figure 16:
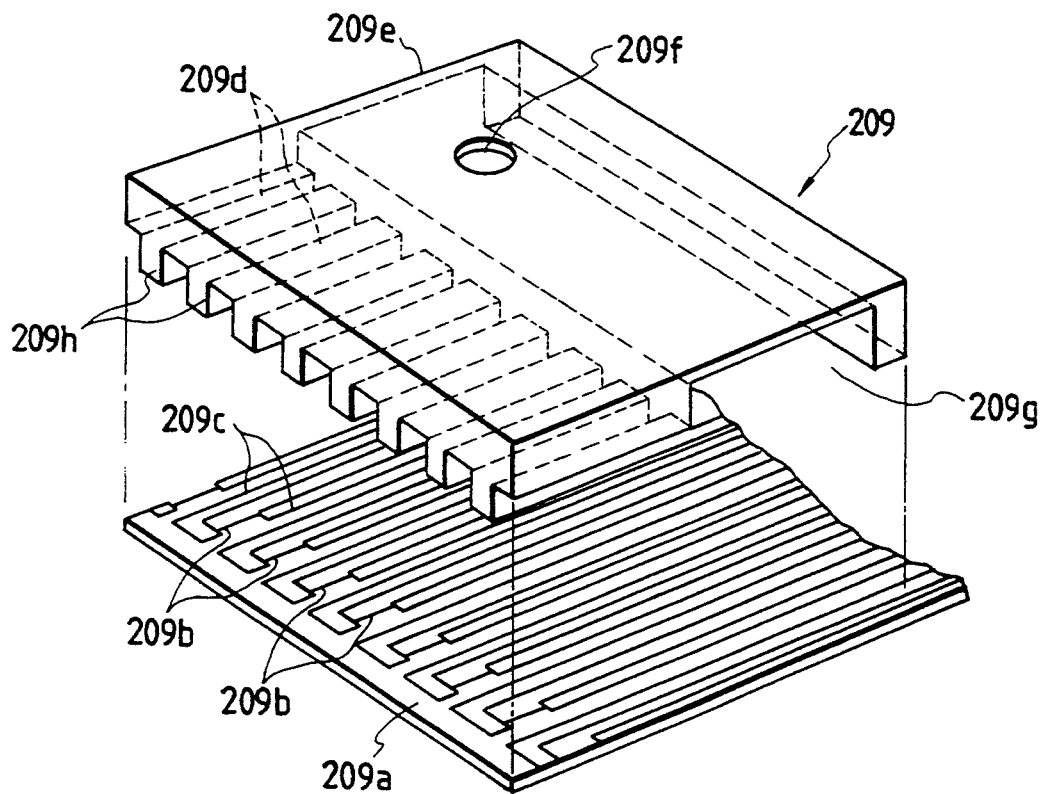
FIG. 16 is a view explaining the disassembly and configuration of a recording head using the ink jet method.

FIG. 16 is a disassembly and configuration explanatory drawing for the recording head 209 which constitutes the recording means, and FIGS. 17A to 17G are explanatory drawings for the bubble jet recording principle. Its typical configuration and principle are disclosed in U.S. Pat. No. 4,723,129 and U.S. Pat. No. 4,740,796, for example.

In FIG. 16, numeral 209a is a heater board, and an electric heat converter (discharge heater) 209b and an electrode 209c of aluminum, etc. for supplying electric power thereto are formed into a film and disposed on a silicon substrate. The recording head is constructed by bonding a top 209e having partitions, which partition a liquid path (nozzle) 209a for recording liquid to the heater board 209a. Also in the specified place of the apparatus, an ink cartridge for feeding ink to the recording head 209 is mounted to the recording head 209 so that it can be replaced.

Ink fed from the ink cartridge through a conduit is poured into a common liquid chamber 209g within a recording head 209 through a feed port 209f provided in a top 209e, and is led into each nozzle 209d from this common liquid chamber 209g. At these nozzles 209d, ink discharge ports 209h are formed, and the ink discharge ports 209h are formed at a specified pitch in the sheet carrying direction opposed to the recording sheet of the recording head 209.

This recording head 209 is mounted on a carriage capable of reciprocating, and synchronized with the travel of the carriage to record by discharging and flying ink.

The principle of ink flying in the bubble jet recording system will be described referring to FIGS. 17A to 17G.

Figure 17A:
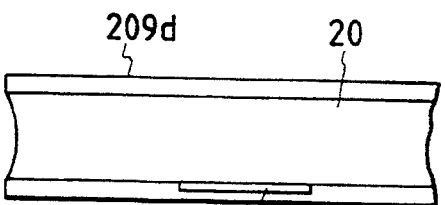
FIGS. 17A to 17G are views explaining the principle of a bubble jet recording.

In a steady state, the surface tension and the external pressure of ink 20 filled in a nozzle 209d are kept in an equilibrium on the discharge port surface as shown in FIG. 17A. To cause the ink 20 to fly in this state, the electric heat converter 209b within the nozzle 209d is energized to rapidly increase the temperature of the ink within the nozzle 209d in excess of neutral boiling.

Figure 17B:
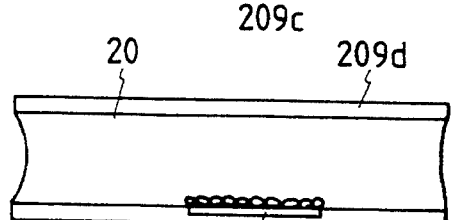
Figure 17C:
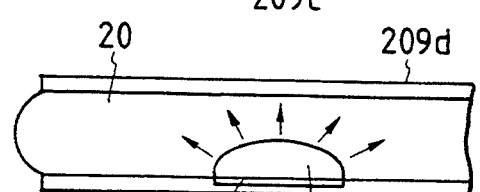

Then the ink adjacent to the electric heat converter 209b is heated to produce a microbubble (bubble) as shown in FIG. 17B, and the ink in the heated portion concerned vaporizes to cause film boiling, and then the bubble 21 rapidly grows as shown in FIG. 17C.

Figure 17D:
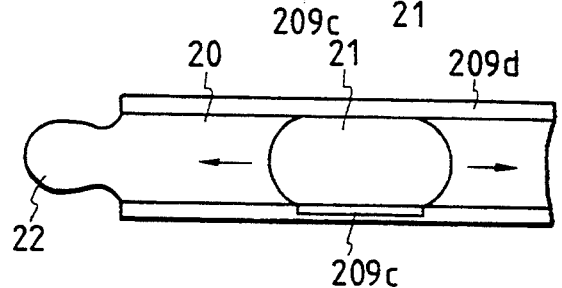
Figure 17E:
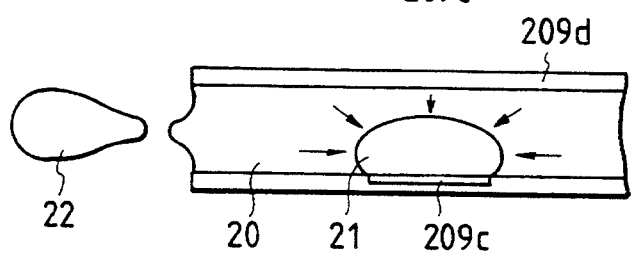
Figure 17F:
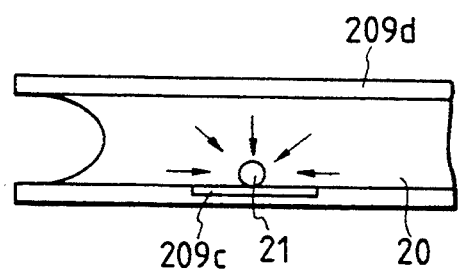

When the bubble 21 grows to the maximum as shown in FIG. 17D, an ink drop 22 is pushed out from the discharge port within the nozzle 209d. Then when energizing the electric heat converter 209b is finished, the grown bubble 21 is cooled by ink 20 within the nozzle 209d, shrinks as shown in FIG. 17E, and the ink drop flies from the discharge port by the growth and shrinkage of this bubble. Further as shown in FIG. 17F, ink comes into contact with the electric heat converter 209b surface to suddenly cool, and the bubble 21 disappears or shrinks into a negligible small volume.

Figure 17G:
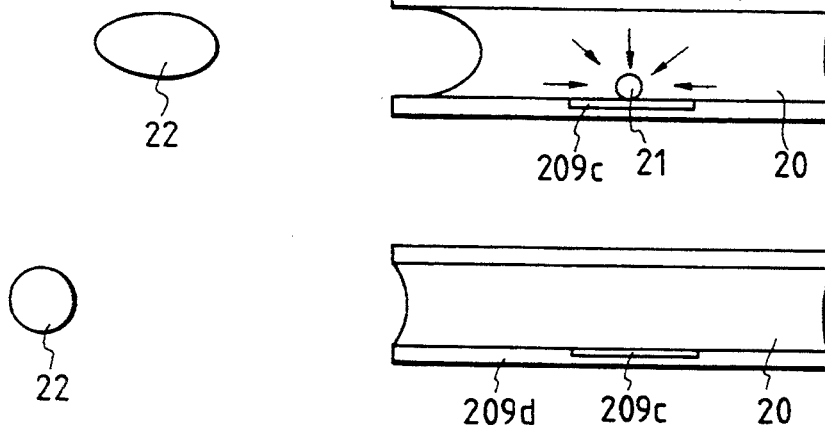

When the bubble 21 shrinks, ink is fed into the nozzle 209d from a common liquid chamber 209g due to the capillary phenomenon as shown in FIG. 17G in preparation for the next energizing.

Accordingly, the carriage mounted with such a recording head is reciprocated, and at the same time, the electric heat converter 209b is energized in accordance with a picture signal by synchronizing with the reciprocation to record an ink image on a recording sheet.

As the configuration of the recording means, configurations disclosed in U.S. Pat. No. 4,558,333 specification, Japanese Laid-Open Patent Publication No. 59-123670, etc. which are located in an area, in which a heat operating portion bends, can be also adopted in addition to the above-mentioned combination of the discharge port, liquid path and electric heat converter.

Also for the above-mentioned recording means, ink may be fed into the recording head from an ink cartridge loaded in the recording apparatus, and also a replaceable type recording head may be used in which an ink receiving chamber is provided within the recording head and the recording head is replaced when ink runs short in the ink receiving chamber.

As the form of a recording apparatus according to the present invention, it is used as an image output terminal (printer) for information processing equipment such as computers, and in addition, as a copying apparatus in combination with a reader, etc., further as a facsimile apparatus having a transmitting and sending function, etc.

Although for the recording head in recording means, a recording head for recording by using the ink jet method was used in this embodiment, the present invention is not limited to this, but any recording heads for recording by using various methods such as the thermography, thermal transfer method, wire dot recording method, or electrostatic recording method may be, of course, used.

In the above-mentioned embodiment, control of a step motor for driving a serial recording head was described, but the present invention is not limited to this. Also in the case of a printer for recording in units of lines using a line type thermal head, etc. as the printing head, for example, it is possible to eliminate uneven carrying of a recording sheet in order to improve the recording quality by using a step motor for a sheet feed motor for carrying a recording sheet and by providing the same carrying control as in this embodiment.

According to the present invention as mentioned above, when accelerating a motor for carrying the recording means or recording medium, it is possible to reduce the speed variation and vibration of the motor by driving the motor with a period relating to the mechanical time constant for the corresponding carrying mechanism in accordance with the motor rotary speed.

We claim:

1. A recording apparatus for moving a recording head to scan for recording, comprising:
   a carriage mounted with a recording head;
   a stepping motor for moving the carriage;

detecting means for detecting whether said carriage is at a home position, wherein said detecting means generates a detection signal when detecting that said carriage is at the home position;

a driver for switching an exciting current to be fed to a coil of said stepping motor in accordance with a pulse signal; and control means for generating the pulse signal to instruct said drive to drive said stepping motor, wherein said control means in initialized by said detection signal, wherein said control means comprises a counter for determining the position of said carriage by counting pulse signals and a timer for determining the period of the pulse signal, and wherein said control means determines on the basis of the count value of said counter whether the rotary speed of said stepping motor exceed a specified value when accelerating until said carriage reaches a record-starting position, and when said control means determines that the rotary speed of said stepping motor is less than the specified value, said control means sets the period of the pulse signal to be short, and when said control means determines that the rotary speed of said stepping motor is more than the specified value, said control means sets the period of the pulse signal of said timer to be long.

2. The recording apparatus according to claim 1, wherein the specified rotary speech of said stepping motor is almost a half of a target rotary speed.

3. The recording apparatus according to claim 1, wherein the recording head is a recording head of an ink jet system, in which ink is discharged to perform recording.

4. The recording apparatus according to claim 1, wherein the recording head is a recording head of an ink jet system, which records by discharging ink by generating a bubble.

5. A recording apparatus for moving a recording head to scan for recording, comprising:

a carriage mounted with a recording head;

a stepping motor for moving said carriage;

a guide member for guiding the moving of said carriage;

an elastic member provided between said carriage and said guide member, wherein said elastic member presses said carriage in a direction by its elastic force;

detecting means for detecting whether said carriage is at a home position, wherein said detecting means generates a detection signal when detecting that said carriage is at the home position;

a driver for switching an exciting current to be fed to a coil of said stepping motor in accordance with a pulse signal; and control means for generating the pulse signal to instruct said driver to drive said stepping motor, wherein said control means in initialized by said detection signal, wherein said control means comprises a counter for determining the position of said carriage by counting pulse signals and a timer for determining the period of the pulse signal, and wherein said control means determines on the basis of the count value of said counter whether the rotary speed of said stepping motor exceed a specified value when accelerating until said carriage reaches a record-starting position, and when said control means determines that the rotary speed of said stepping motor is less than the specified value, said control means sets the period of the timer pulse signal to be short, and when said control means determines that the rotary speed of said stepping motor is more than the specified value, said control means sets the period of the timer pulse signal to be long.

6. The recording apparatus according to claim 5, wherein said elastic member is coated with a solid lubricant.

7. The recording apparatus according to claim 5, wherein said elastic member is integral with said carrier.

* * * * *

UNITED STATES PATENT AND TRADEMARK OFFICE
CERTIFICATE OF CORRECTION

PATENT NO. : 5,334,920

DATED : August 2, 1994

INVENTOR(S) : Ito et al.

It is certified that error appears in the above-indentified patent and that said Letters Patent is hereby corrected as shown below:

ON THE COVER PAGE

Insert--[30] Foreign Application Priority Data

June 11, 1990 [JP] Japan ...... 2-149812
June 11, 1990 [JP] Japan ...... 2-152177--.

AT [56] REFERENCES CITED

Foreign Patent Documents

"0077444 4/1983 European Pat. Off." should read
--0077455 4/1983 European Pat. Off.--.
Insert: --59-123670 7/84 Japan--.

COLUMN 4

Line 44, "be It" should read --belt--.

COLUMN 5

Line 19, "process" should read --the process--.
line 48, "signal 25," should read --signal 25--.

COLUMN 6

Line 59, "of" should be deleted.
line 60, "hundreds" should read --hundreds of--.

UNITED STATES PATENT AND TRADEMARK OFFICE
CERTIFICATE OF CORRECTION

PATENT NO. : 5,334,920
DATED : August 2, 1994
INVENTOR(S) : Ito et al.

It is certified that error appears in the above-indentified patent and that said Letters Patent is hereby corrected as shown below:

COLUMN 7

Line 60, "single 25." should read --signal 25.--

COLUMN 8

Line 17, "within, it" should read --within it,--.

COLUMN 9

Line 43, "in of arrow P" should read --of arrow P in--.
    line 44, "direction." should read --direction--.
    line 56, "carriage 20 6" should read --carriage 206--.
    line 59, "could" should read --could be--.

COLUMN 11

Line 32, "(nozzle) 209a" should read --(nozzle) 209d--.
    line 47, "and" should read --and is--.

UNITED STATES PATENT AND TRADEMARK OFFICE
CERTIFICATE OF CORRECTION

PATENT NO. : 5,334,920                    Page 3 of 3

DATED      : August 2, 1994

INVENTOR(S): Ito et al.

It is certified that error appears in the above-indentified patent and that said Letters Patent is hereby corrected as shown below:

<u>COLUMN 13</u>

Line 9, "said drive" should read --said driver--.
    line 17, "exceed" should read --exceeds--.
    line 29, "speech" should read --speed--.

<u>COLUMN 14</u>

Line 18, "in" should read --is--.
    line 25, "exceed" should read --exceeds--.

Signed and Sealed this

Twenty-seventh Day of December, 1994

Attest:

BRUCE LEHMAN

Attesting Officer      Commissioner of Patents and Trademarks